United States Patent
Fiedler et al.

(10) Patent No.: US 8,065,104 B2
(45) Date of Patent: Nov. 22, 2011

(54) METHOD FOR DETERMINING AND CORRECTING INCORRECT ORIENTATIONS AND OFFSETS OF THE SENSORS OF AN INERTIAL MEASUREMENT UNIT IN A LAND VEHICLE

(75) Inventors: Jens Fiedler, Thalmassing (DE); Andreas Mayer, Regensburg (DE); Thomas Schweiger, Wörth (DE); Martin Stratesteffen, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 385 days.

(21) Appl. No.: 11/995,074

(22) PCT Filed: May 11, 2006

(86) PCT No.: PCT/EP2006/062248
§ 371 (c)(1),
(2), (4) Date: Jan. 8, 2008

(87) PCT Pub. No.: WO2007/009825
PCT Pub. Date: Jan. 25, 2007

(65) Prior Publication Data
US 2008/0208501 A1     Aug. 28, 2008

(30) Foreign Application Priority Data
Jul. 15, 2005   (DE) .......................... 10 2005 033 237

(51) Int. Cl.
*G01C 17/38*    (2006.01)
*G01P 21/00*    (2006.01)

(52) U.S. Cl. .......................................... 702/95; 73/1.38

(58) Field of Classification Search .................... 702/95, 702/85, 150–153, 189, 90–94, 97, 104, 105, 702/127, 141, 142, 145–148, 155, 158, 179, 702/182, 183, 199; 701/70, 79, 110, 200, 701/201, 220; 73/1.37, 1.38, 1.75–1.79, 73/488, 493, 498, 503, 510, 511, 514.01, 73/514.02; 180/170, 197, 282; 307/9.1, 307/10.1; 340/440, 441

See application file for complete search history.

(56) References Cited

U.S. PATENT DOCUMENTS 6,028,371 A * 2/2000 Baur et al. .................... 307/10.1
(Continued)

FOREIGN PATENT DOCUMENTS

DE         19844880       4/2000
(Continued)

OTHER PUBLICATIONS

Eduardo et al., Initial Calibration and Alignment of an Inertial Navigation, 1997 IEEE, pp. 175-180.*

(Continued)

*Primary Examiner* — Mohamed Charioui
*Assistant Examiner* — Toan Le
(74) *Attorney, Agent, or Firm* — King & Spalding L.L.P.

(57) ABSTRACT

An inertial measurement unit (IMU) contains three linear acceleration sensors and three rotational speed sensors. For the sensors there are desired installation directions parallel to the co-ordinate axes of a Cartesian co-ordinate system which is fixed to the vehicle. The actual installation directions of the sensors may differ from the desired installation directions owing to incorrect orientations. By comparing accelerations which are measured by the linear acceleration sensors for different attitudes of the vehicle with acceleration values which are known for these different attitudes in the Cartesian co-ordinate system which is fixed to the vehicle, the actual installation directions of the linear acceleration sensors are determined. By using a co-ordinate transformation it is then possible to convert the measured accelerations into the actual accelerations.

15 Claims, 2 Drawing Sheets

U.S. PATENT DOCUMENTS

| | | | |
|---|---|---|---|
| 6,244,109 B1 | 6/2001 | Kohler et al. | 73/488 |
| 6,519,515 B1 | 2/2003 | Baumann et al. | 701/34 |
| 6,532,419 B1 * | 3/2003 | Begin et al. | 701/220 |
| 6,729,176 B2 * | 5/2004 | Begin | 73/1.38 |
| 6,738,721 B1 | 5/2004 | Drücke et al. | 702/95 |
| 6,859,700 B2 | 2/2005 | Bolzmann et al. | 701/34 |
| 6,874,349 B2 | 4/2005 | Mattes | 73/1.37 |
| 7,707,867 B2 * | 5/2010 | Babala et al. | 73/1.38 |
| 2001/0016791 A1 * | 8/2001 | Bolzmann et al. | 701/34 |
| 2002/0100310 A1 | 8/2002 | Begin | 73/1.37 |
| 2003/0061859 A1 | 4/2003 | Rothoff | 73/1.37 |
| 2003/0084704 A1 | 5/2003 | Hanse | 73/1.38 |

FOREIGN PATENT DOCUMENTS

| | | |
|---|---|---|
| DE | 19844880 C2 | 4/2000 |
| DE | 19844911 | 4/2000 |
| DE | 19844911 A1 | 4/2000 |
| DE | 19858621 | 7/2000 |
| DE | 19858621 C2 | 7/2000 |
| DE | 19925434 | 12/2000 |
| DE | 19925434 A1 | 12/2000 |
| DE | 19936596 | 1/2001 |
| DE | 19936596 C1 | 1/2001 |
| DE | 19939984 | 3/2001 |
| DE | 19939984 A1 | 3/2001 |
| DE | 10155667 | 1/2003 |
| DE | 10155667 C1 | 1/2003 |
| DE | 10164108 | 7/2003 |
| DE | 10164108 A1 | 7/2003 |
| EP | 0511730 | 11/1992 |
| EP | 0511730 A2 | 11/1992 |

OTHER PUBLICATIONS

International Search Report with Written Opinion (Written Opinion Supplemental Sheet English Translation provided) PCT/EP2006/062248, 11 pages, Jul. 31, 2006.

International Search Report for Application No. PCT/EP2006/062248 (5 pages), Jul. 31, 2006.

German Office Action for Application No. 10 2005 033 237.4 (4 pages), Mar. 15, 2006.

* cited by examiner

US 8,065,104 B2

METHOD FOR DETERMINING AND CORRECTING INCORRECT ORIENTATIONS AND OFFSETS OF THE SENSORS OF AN INERTIAL MEASUREMENT UNIT IN A LAND VEHICLE

CROSS-REFERENCE TO RELATED APPLICATIONS

This application is a U.S. national stage application of International Application No. PCT/EP2006/062248 filed May 11, 2006, which designates the United States of America, and claims priority to German application number 10 2005 033 237.4 filed Jul. 15, 2005, the contents of which are hereby incorporated by reference in their entirety.

TECHNICAL FIELD

The present application concerns a method for determining and correcting incorrect orientations and offsets of the sensors of an inertial measurement unit in a land vehicle.

BACKGROUND

Sensor clusters, consisting of acceleration sensors and rotational speed sensors, have been used in automotive engineering for some time for applications, for example in electronic stability programs (ESP), in flashover recognition and prevention and for navigation. These sensor clusters generally contain one to two rotational speed sensors for determining the yaw rate (angular velocity about an axis vertical to the standing surface of the vehicle) or the roll rate (angular velocity about the longitudinal axis of the vehicle) and one to two acceleration sensors for determining the transverse or longitudinal acceleration of the vehicle.

In the meantime it has proven possible to produce rotational speed sensors at low cost with characteristics that are adequate for the automotive field based on MEMS technology (MEMS=Micro Electro Mechanical Systems), so that sensor clusters with at least three rotational speed sensors and at least three acceleration sensors are also feasible for mid-range automobiles without high additional costs. Sensor clusters of this type are also referred to as IMUs (Inertial Measurement Units). An IMU contains three rotational speed sensors and three acceleration sensors. The acceleration sensors are disposed in such a manner that they measure the components of the acceleration vector of a fixed point in the vehicle in the longitudinal direction and transverse direction of the vehicle and vertical to the standing surface of the vehicle. These directions are generally orthogonal to each other in pairs. The rotational speed sensors are disposed in such a manner that they measure the components of the vector of the current angular velocity of the vehicle in respect of the same three directions.

With regard to the central monitoring of the different electronic systems in the vehicle and possibilities for using fewer sensors, such sensor clusters, which make their data available to different systems in the vehicle, are of particular interest.

If all or some of the corresponding sensors in such a sensor cluster are not oriented in the desired directions (e.g. due to errors in the manufacturing process), these incorrect orientations can generally not be located without taking measurements within the cluster housing.

SUMMARY

According to an embodiment, incorrect orientations can be determined without major outlay and can be corrected by a method for determining incorrect orientations of sensors of a sensor cluster in a vehicle, wherein the sensor cluster has either three linear acceleration sensors and/or three rotational speed sensors, comprising the steps of: predetermining desired installation directions of the sensors in relation to coordinate axes of a fixed vehicle Cartesian coordinate system; and determining actual installation directions of the sensors, which can deviate from the desired installation directions due to incorrect orientations, by comparing values measured by the sensors in different conditions with values known for these different conditions in the fixed vehicle Cartesian coordinate system.

According to further embodiment, any offset can be determined during measurements by the sensors by means of a suitable plurality of measurements by the sensors in different conditions, which result in known values in the fixed vehicle Cartesian coordinate system. According to further embodiment, mean values during a vehicle trip can be selected as known values in the fixed vehicle Cartesian coordinate system. According to further embodiment, values determined by other sensors can be selected as known values in the fixed vehicle Cartesian coordinate system.

According to another embodiment, a method for correcting measurement values of sensors of a sensor cluster in a vehicle, comprises the steps of: determining incorrect orientations of the sensors by predetermining desired installation directions of the sensors in relation to coordinate axes of a fixed vehicle Cartesian coordinate system and determining actual installation directions of the sensors by comparing values measured by the sensors in different conditions with values known for these different conditions in the fixed vehicle Cartesian coordinate system; and wherein with the aid of incorrect orientations determined from values measured by the sensors actual values of the vehicle in relation to a fixed vehicle Cartesian coordinate system are predicted.

According to yet another embodiment, a method for determining the position of an inertial sensor cluster in a vehicle, comprises the steps of: determining the position in the longitudinal direction of the vehicle, wherein the distance between the inertial sensor cluster and the rear axle of the vehicle is determined by averaging the longitudinal acceleration of the vehicle, which is not measured on the rear axle.

According to yet another embodiment, a computer readable medium storing a computer program, which when executed on a computation unit, a microcontroller, DSP, FPGA or computer or on a plurality of these in a network, performs the steps of: predetermining desired installation directions of the sensors in relation to coordinate axes of a fixed vehicle Cartesian coordinate system; determining actual installation directions of the sensors by comparing values measured by the sensors in different conditions with values known for these different conditions in the fixed vehicle Cartesian coordinate system.

BRIEF DESCRIPTION OF THE DRAWINGS

The exemplary embodiments are shown schematically in the figures. The same reference characters in the individual figures refer to elements which are the same or have identical functions or correspond to each other in respect of their functions. In the figures, more specifically:

FIG. 2 shows a schematic diagram of the position changes of a vehicle;

DETAILED DESCRIPTION

Figure 1:
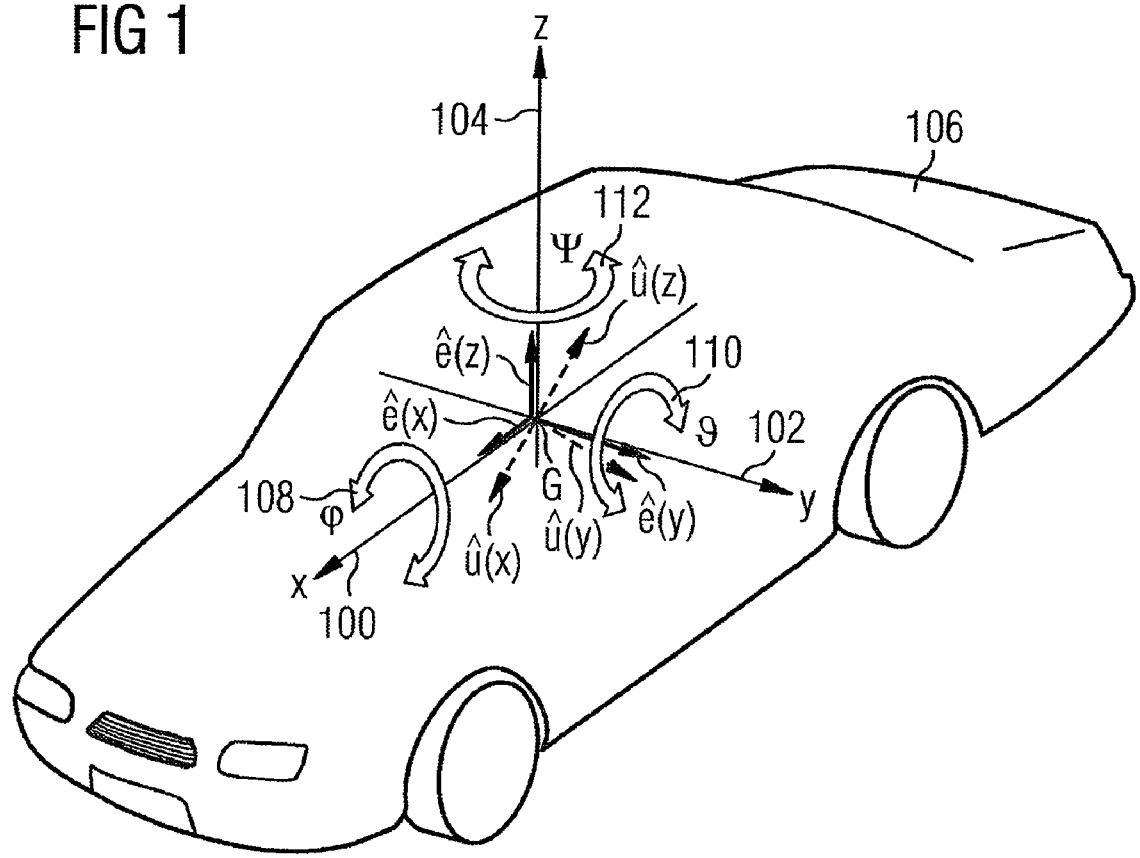
FIG. 1 shows a schematic diagram of the fixed vehicle coordinate system, the installation directions of the sensors and the movements of the vehicle in the six degrees of freedom.

A method is indicated for the quantitative determination of incorrect orientations of sensors in particular within the IMU or incorrect orientations of the IMU as a whole. A method for determining the position of the IMU within the vehicle is similarly indicated. Incorrect orientations of IMU sensors and incorrect positioning of the IMU are corrected in a computation unit, which prepares and processes the IMU sensor signals.

If at least three acceleration sensors are disposed in three linearly independent directions and at least three acceleration sensors are disposed in three linearly independent directions in an IMU, it becomes possible to identify, quantitatively define and correct incorrect orientations with the aid of simple manipulations.

Individual method steps are described in more detail below. The steps do not necessarily have to be implemented in the order indicated and the method to be described can also have further unspecified steps.

A method is proposed for determining incorrect orientations of sensors of a sensor cluster in a vehicle. A vehicle can be any type of vehicle, for example an aircraft or ship, but is preferably a land vehicle, such as a motorbike, railed vehicle, bus, truck or automobile.

The sensor cluster has at least three linear acceleration sensors and/or three rotational speed sensors. These sensors have desired installation directions in relation to coordinate axes of a fixed vehicle Cartesian coordinate system. The desired installation directions are generally parallel to these coordinate axes. The actual installation directions of the sensors can however deviate from the desired installation directions due to incorrect orientations.

By comparing values measured by the sensors in different conditions with values in the fixed vehicle Cartesian coordinate system that are known for these different conditions, it is possible to determine the actual installation directions of the linear acceleration sensors. As well as the values themselves, the results of processing said values, e.g. mathematically modified, perhaps integrated values, can be compared with each other in this process.

Known values can result for example from defined tilt directions of the vehicle or by forming a mean value over a longer period, e.g. a trip. Or they are determined by other sensors, for example from wheel speeds and the steering angle.

It is also possible to determine any offset in measurements by the sensors using a suitable plurality of measurements by the sensors in different conditions, which result in known values in the fixed vehicle Cartesian coordinate system.

The suitable plurality of measurements by the sensors in different conditions must be large enough to be able to determine the number of unknowns, which occur with an additional offset correction. For example measurements can be taken at more than one angle per tilt direction, generally one angle and an angle offset by 180° thereto.

Sensor clusters in the form of IMUs also typically have rotational speed sensors, which likewise have desired installation directions and actual installation directions that occasionally deviate therefrom. For such IMUs the incorrect orientations of the actual installation directions of the rotational speed sensors are determined.

If mean values during a vehicle trip are selected as known values in the fixed vehicle Cartesian coordinate system, incorrect orientations and offsets can also be determined during operation of the vehicle with the aid of self-learning algorithms. Typically accelerations average out to zero during a trip, which starts and ends with a stationary state, when the acceleration is measured on the unsteered rear axle. There is then no need for special calibrations or measurement cycles, which would have to be incorporated into the production process.

Known values in the fixed vehicle Cartesian coordinate system can also be obtained by means of values of this acceleration determined by other sensors, for example by means of long-term means values for the difference between values measured by the longitudinal and transverse acceleration sensors and the actual accelerations determined from the wheel speeds and steering angle.

The values obtained relating to the incorrect orientations can then be used to correct measurement values from sensors of a sensor cluster in a vehicle, since the determined incorrect orientations can be used to conclude actual acceleration values of the vehicle, in relation to a fixed vehicle Cartesian coordinate system, from values measured by the sensors. This correction is typically corrected in a computation unit, which prepares and processes the sensor signals. In mathematical terms this is a coordinate transformation.

A method is also proposed for determining the position of an inertial sensor cluster in a vehicle, wherein the position in the longitudinal direction of the vehicle is determined, wherein the distance between the inertial sensor cluster and the rear axle of the vehicle is determined by averaging the longitudinal acceleration of the vehicle, which is not measured in the rear axle.

In particular a method is proposed for determining the position of an inertial sensor cluster in a vehicle in the longitudinal direction of the vehicle, wherein the following equation is used to determine the distance $l_R$ between the inertial sensor cluster and the rear axle of the vehicle:

$$\int_0^T a_x(t)dt = v_x(T) - v_x(0) + l_R \int_0^T \omega_z^2(t)dt,$$

where T is the observation period, $a_x(t)$ the acceleration of the vehicle in the longitudinal direction, measured in a fixed vehicle Cartesian coordinate system, $v_x$ the longitudinal velocity of the vehicle, and $\omega_z$ the yaw rate of the vehicle.

In general the methods shown make it possible, by simple manipulations at the vehicle (inclinations) and drive maneuvers, to determine all the information about incorrect orientations of sensors of an IMU and then to correct the incorrect orientations. To correct incorrect sensor orientations it is therefore no longer necessary to open the sensor cluster and intervene therein or even to replace the cluster.

A subsequent determination of the position of an IMU sensor cluster in the vehicle is difficult, if the installation site is difficult to access. The described method for indirect position location makes direct access to the installation site unnecessary.

According to another embodiment, a computer program, executes the method according to various embodiments when run on a computation unit, a microcontroller, DSP, FPGA or computer or on a plurality of these in a network. A typical computation unit is an on-board computer in a vehicle or part of the vehicle electronic system, for example a microcontroller in an ECU (Electronic Control Unit).

According to yet another embodiment a computer program comprises program code means, to implement the method according to various embodiments, when the program is executed on a computation unit, a microcontroller, DSP, FPGA or computer or on a plurality of these in a network. In particular the program code means can be instructions stored on a machine-readable data medium.

According to yet another embodiment, a data medium, on which a data structure is stored, which, after being loaded into a random access memory and/or main memory of a computation unit, a microcontroller, DSP, FPGA or computer or a plurality of these in a network, can execute the method according to various embodiments.

According to yet another embodiment, a computer program product comprises program code means stored on a machine-readable medium, to implement the method according to various embodiments, wherein the program is executed on a computation unit, a microcontroller, DSP, FPGA or computer or on a plurality of these in a network.

A computer program product here refers to the program as a commercial product. It can essentially be in any form, for example on paper or a machine-readable data medium, and can in particular be distributed by way of a data transmission network.

According to yet another embodiment, a modulated data signal contains instructions for executing the method according to various embodiments, wherein the instructions can be executed by a computation unit, a microcontroller, DSP, FPGA or computer or by a plurality of these in a network.

Further details and features will emerge from the description which follows of preferred exemplary embodiments in conjunction with the subclaims. The respective features can be realized alone per se or in combinations of more than one here. The possible ways in which the various objects of the present invention can be achieved are not restricted to the exemplary embodiments.

For clarity FIG. 1 shows a typical diagram of the fixed vehicle coordinate system and the movements in the six degrees of freedom. It is a three-dimensional coordinate system with an x-axis 100, a y-axis 102 and a z-axis 104. We will take as our basis a fixed vehicle coordinate system, more specifically a coordinate system, which is connected permanently to the vehicle structure or the (presumably rigid) body 106 and whose x-axis 100 points in the forward direction of the vehicle and whose z-axis 104 points upward at right angles to the drive path. The direction of the y-axis 102 is determined in that the coordinate system is intended to be a right-handed system. The point of origin of the coordinate system is generally disposed in the center of gravity G of the vehicle body 106.

If the vehicle response about the center of gravity G is assumed to be the movement of a rigid body in three-dimensional space, the vehicle response can be defined as a movement with six degrees of freedom. The individual degrees of freedom are hereby defined as follows:

linear movement along the x-axis 100—longitudinal movement; linear movement along the y-axis 102—transverse movement; linear movement along the z-axis 104—vertical movement; rotational movement about the x-axis 100—rolling movement 108 with the roll angle $\phi$;

rotational movement about the y-axis 102—pitch movement 110 with the pitch angle $\theta$; and rotational movement about the z-axis 104—yaw movement 112 with the yaw angle $\psi$.

The desired installation directions of the sensors (acceleration sensors and rotational speed sensors) run parallel to the coordinate axes and are designated in the fixed vehicle coordinate system by the unit vectors $\hat{e}(j), j=x,y,z$. The actual installation directions, which can differ from the desired installation directions due to incorrect orientations, are designated in the fixed vehicle coordinate system with the unit vectors $\hat{u}(j), j=x,y,z$. They are not necessarily orthogonal in pairs.

The vector of effective acceleration $\vec{a}^{(e)}$ is defined as $$\vec{a}^{(e)} = \vec{a} - g\hat{n},$$

where $\vec{a}$ is the vector of actual acceleration in the fixed vehicle coordinate system and $\hat{n}$ is the unit vector in the direction of gravity, which points "downward". In this process $$\hat{n} = (\sin\theta, -\sin\phi\cos\theta, -\cos\phi\cos\theta)^T,$$

measured in the coordinate system of the vehicle, with the roll angle $\phi$ and the pitch angle $\theta$.

The actual acceleration $\vec{a}$ reflects the movement of the vehicle. The acceleration measured by an acceleration sensor is referred to as the effective acceleration $\vec{a}^{(e)}$. When the vehicle is stationary, the actual acceleration $\vec{a}$ disappears and the effective acceleration $\vec{a}^{(e)}$ points in the direction counter to gravity.

A standard acceleration sensor is made for example from a mass, which is suspended in a sprung manner. If such an acceleration sensor is used for example to determine the acceleration in the z-direction and the vehicle is stationary, the mass is deflected downward by gravity and the sensor measures a corresponding effective acceleration.

The variables measured by the three acceleration sensors are the projection of the effective acceleration onto the respective sensor axis:

$$b^{(e)}(j) = \hat{u}(j) \cdot \vec{a}^{(e)} = \hat{u}(j) \cdot \vec{a} - g\hat{u}(j) \cdot \hat{n},$$

where • indicates the scalar product. In other words:

$$\vec{b}^{(e)} = \ddot{U} \cdot \vec{a}^{(e)}, \qquad (1)$$

where the rows of the 3×3 matrix $\ddot{U}$ are the components of the unit vectors $\hat{u}(j), j=x,y,z$ in relation to the fixed vehicle Cartesian coordinate system. $\ddot{U}$ is a coordinate transformation matrix.

What is required are the three Cartesian components $a_j^{(e)}$, $j=x,y,z$ of the vector of effective acceleration $\vec{a}^{(e)}$, which would be measured by the acceleration sensors, if they were oriented along the axes of the fixed vehicle coordinate system.

If the three unit vectors $\hat{u}(j), j=x,y,z$ are not all in one plane, which is almost always the case, the required variables $a_j^{(e)}$, $j=x,y,z$ can be calculated from $b^{(e)}(j), j=x,y,z$ by inverting the 3×3 matrix $\ddot{U}$:

$$\vec{a}^{(e)} = \ddot{U}^{-1} \cdot \vec{b}^{(e)}. \qquad (2)$$

Methods for determining the matrix $\ddot{U}$ are indicated below.

To this end three static situations are first considered:

1$^{St}$ Position

Figure 2A:
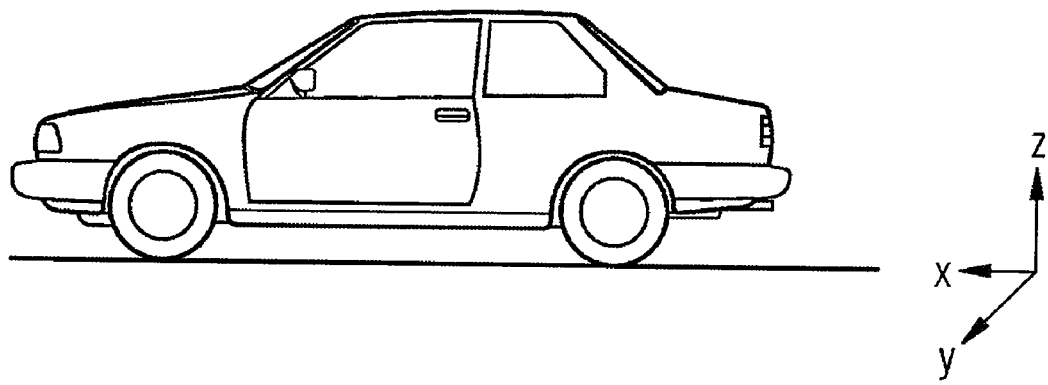
FIG. 2A shows a schematic diagram of the position of a vehicle on a horizontal surface.

The first position is shown in FIG. 2A. The vehicle stands on a horizontal surface. The vector of effective acceleration $\vec{a}^{(e,1)}$ is then $\vec{a}^{(e,1)} = (0,0,g)^T$, from which according to equation (1)

$$b^{(e,1)}(j) = \hat{u}_z(j)g, j=x,y,z,$$

and $$\hat{u}_z(j) = b^{(e,1)}(j)/g, j=x,y,z \qquad (3)$$

result. Here $b^{(e,1)}(j), j=x,y,z$ are the values supplied by the three acceleration sensors in this first position of the vehicle. $\hat{u}_z(j)$ is the z-component of the unit vector $\hat{u}(j), j=x,y,z$ of the actual installation directions in the fixed vehicle coordinate system determined therewith.

2$^{nd}$ Position

Figure 2B:
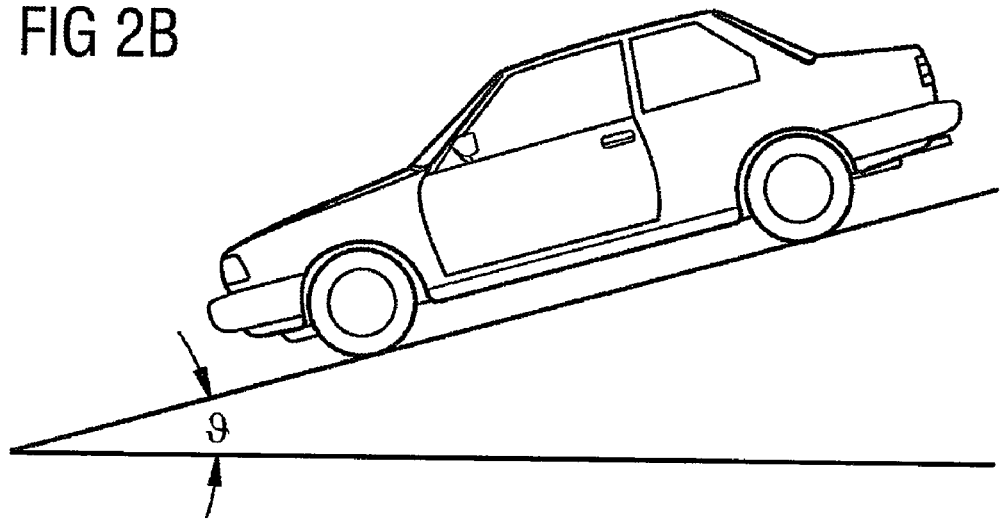
FIG. 2B shows a schematic diagram of the position change of a vehicle when rotated about the y-axis or about the pitch angle θ.

In the second position, as shown in FIG. 2B, the vehicle is inclined about the pitch angle $\theta$ forward or backward. If the sensor cluster is incorporated in the vehicle structure, as is generally the case, the inclination of the structure must be determined. If the vehicle is on a ramp or inclined plane, which is inclined through an angle $\theta_0$, the angle difference, $\Delta\theta=\theta-\theta_0$ between the inclination of the vehicle structure $\theta$ and the inclination of the inclined plane $\theta_0$ must be determined, so that $\theta=\theta_0+\Delta\theta$ can be worked out.

If level sensors are incorporated in the vehicle, to indicate the spring paths of wheel suspension systems or axles, these can be used to determine the angle difference $\Delta\theta$. Alternatively the angle difference $\Delta\theta$ can be calculated with the aid of a vehicle model, which describes the elasticities of the vehicle, in particular the elastic coupling of chassis and vehicle structure in sufficient detail (e.g. in the context of a five-mass model). Non-linearities of the corresponding springs should also be taken into account here. The inclination of the vehicle structure can also be determined by means of additional inclination sensors.

The vector of effective acceleration $\vec{a}^{(e,2+)}$ in this second position is then $$\vec{a}^{(e,2+)} = g(-\sin\theta, 0, \cos\theta)^T$$

and equation (1) gives:

$$\vec{b}^{(e,2+)} = \vec{U} \cdot g(-\sin\theta, 0, \cos\theta)^T$$

and $$b^{(e,2+)}(j) = -\hat{u}_x(j) \cdot g \sin\theta + \hat{u}_z(j) \cdot g \cos\theta, j=x,y,z.$$

Here $b^{(e,2+)}(j), j=x,y,z$ are the values supplied by the three acceleration sensors in this second position of the vehicle. Inserting equation (3) for $\hat{u}_z(j)$ gives $$b^{(e,2+)}(j) = -\hat{u}_x(j) \cdot g \sin\theta + b^{(e,1)}(j)/g \cdot g \cos\theta, j=x,y,z.$$

After resolution according to $\hat{u}_x(j)$ $$\hat{u}_x(j) = [b^{(e,1)}(j)\cos\vartheta - b^{(e,2+)}(j)]\frac{1}{g\sin\vartheta}, \; j=x,y,z. \quad (4)$$

$\hat{u}_x(j)$ is the z-component of the unit vector $\hat{u}(j), j=x,y,z$ of the actual installation directions of the sensors in the fixed vehicle coordinate system determined therewith.

3$^{rd}$ Position

Figure 2C:
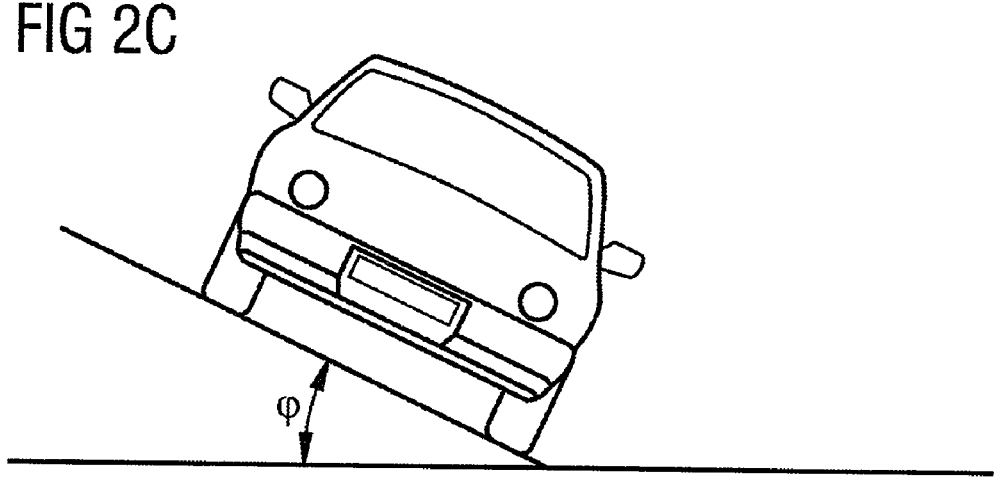
FIG. 2C shows a schematic diagram of the position change of a vehicle when rotated about the x-axis or about the roll angle φ.

The y-components of the unit vectors $\hat{u}(j), j=x,y,z$ still have to be determined. To this end the vehicle is inclined laterally through the roll angle $\phi$ in a third position. This position is shown in FIG. 2C.

If the sensor cluster is incorporated in the vehicle structure, the angle of inclination of the structure must again be determined, as it does not correspond to the vehicle path/ramp. The angle difference can be determined with the aid of level sensors on the wheel suspension systems and/or a vehicle model.

The vector of effective acceleration $\vec{a}^{(e,3+)}$ for this third position is then $$\vec{a}^{(e,3+)} = g(0, \sin\phi, \cos\phi)^T$$

giving, as in the second position, $$\hat{u}_y(j) = [b^{(e,3+)}(j) - b^{(e,1)}(j)\cos\varphi]\frac{1}{g\sin\varphi}, \; j=x,y,z. \quad (5)$$

Here $b^{(e,3+)}(j), j=x, y, z$ are the values supplied by the three acceleration sensors in this third position of the vehicle.

The matrix $\vec{U}$ is thus fully defined and the required components of the vector of effective acceleration in respect of the fixed vehicle Cartesian coordinate system can be determined at any time from the measurement values of the possibly incorrectly oriented acceleration sensors according to $$a_j^{(e)} = \sum_{j'=x,y,z} M_{jj'} b^{(e)}(j), \; j=x,y,z$$

and $$\vec{a}^{(e)} = M \cdot \vec{b}^{(e)},$$

where the matrix $\vec{M}$ is the inverse of the matrix $\vec{U}$:

$$\vec{M} = \vec{U}^{-1},$$

thus according to equation (2).

Offset Correction:

If there is a non-negligible and quantitatively unknown offset present at the acceleration sensors, in other words they indicate accelerations for instance when none are present, an additive error is present and the vehicle is rotated through 180° on the ramp inclined through the angle $-\theta_0$ or $-\phi_0$. This corresponds to an inclination about the angle $-\theta_0$ or $-\phi_0$. The outputs of the acceleration sensors obtained in this position of the vehicle are designated as $b^{(e,2-)}(j), j=x, y, z$ and $b^{(e,3-)}(j), j=x, y, z$.

The corresponding angles of inclination of the structure should be determined here, these generally not being exactly equal to $-\theta_0$ or $-\phi_0$. This can be done again with the aid of level sensors for instance or with the aid of a vehicle model or by means of further inclination sensors.

The components of the direction unit vectors $\hat{u}(j), j=x,y,z$ are then $$\hat{u}_x(j) = [b^{(e,2-)}(j) - b^{(e,2+)}(j)]\frac{1}{g\sin\vartheta}, \; j=x,y,z,$$

$$\hat{u}_y(j) = [b^{(e,3-)}(j) - b^{(e,3+)}(j)]\frac{1}{g\sin\vartheta}, \; j=x,y,z,$$

$$\hat{u}_z(j) = \left\{b^{(e,1)}(j) - \frac{1}{2}[b^{(e,2+)}(j) + b^{(e,2-)}(j)]\right\}\frac{1}{g(1-\cos\vartheta)}, \; j=x,y,z,$$

where for derivation purposes, differences between sensor values of the same sensor are always used, with which additive errors emerge. This allows the additive offset to be eliminated from the measured accelerations.

Use can also be made of the fact that the direction vectors $\hat{u}(j), j=x,y,z$ are unit vectors and that therefore $$\hat{u}_x^2(j) + \hat{u}_y^2(j) + \hat{u}_z^2(j) = 1, j=x,y,z.$$

This causes the equation system to be over-defined and certain errors can be minimized by means of a compensation calculation. In these derivations it was assumed that the offset of the acceleration sensors is independent of their orientation in space. The compensation calculation can be effected using a Kalman filter.

To identify an offset of the acceleration sensors, use can be made of the fact that when the vehicle is stationary the following must apply $$a_x^{(e)2}+a_y^{(e)2}+a_z^{(e)2}=g^2.$$

If not, at least one of the sensors must have an offset.

Rotational Speed Sensors

The procedure is similar for the rotational speed sensors. The outputs of the three rotational speed sensors, $\omega_j, j=x, y, z$ are linked to the rotation vector $\vec{\omega}$ via ti $\tilde{\omega}_j = \hat{u}(j) \cdot \vec{\omega}$.

The offsets of the rotational speed sensors can be identified and corrected when the vehicle is stationary, since when the vehicle is stationary all the rotational speeds should disappear.

To determine incorrect orientations of the rotational speed sensors, the same maneuver is used as for the acceleration sensors, in other words the three different positions, with the corresponding rotational movements now having to be monitored over time. In the first position a rotational movement must also be executed about the z-axis.

For the calculation of $\hat{u}(j), j=x,y,z$ from the signals $\tilde{\omega}_j, j=x, y, z$ of the three rotational speed sensors in the individual positions, the above formulae (2), (3), (4) and (5) are used with the following identifiers or replacements:

$\vec{a}^{(e)}$ corresponds to the vector from the three angles $\phi$, $\theta$ and $\psi$.

The angles roll angle $\phi$, pitch angle $\theta$ and yaw angle $\psi$ set in the individual positions are related to the rotational speeds by way of integral relationships relating to the corresponding rotational speeds:

rotation of the vehicle about the normal axis or z-axis on a horizontal plane:

$$\int_0^T \tilde{\omega}_j^{(1)}(t)dt = \psi \hat{u}_z(j),$$

where T is the measuring time and $\tilde{\omega}_j^{(1)}(t)$ is the signal of the jth rotational speed sensor measured during rotation in the first position about the z-axis of the vehicle.

rotation of the vehicle about the transverse axis:

$$\int_0^T \tilde{\omega}_j^{(2)}(t)dt = \vartheta \hat{u}_y(j)$$

rotation of the vehicle about the longitudinal axis:

$$\int_0^T \tilde{\omega}_j^{(3)}(t)dt = \varphi \hat{u}_x(j)$$

The integrals $$\int_0^T \tilde{\omega}_j(t)dt$$

correspond to the acceleration values $b^{(e)}(j), j=x,y,z$.

The unit direction vectors $\hat{u}(j), j=x,y,z$ of the rotational direction sensors are thus determined. It is thus possible from the measured rotational speeds $\tilde{\omega}_j, j=x,y,z$ to calculate the actual rotational speeds $\vec{\omega}$ in relation to the Cartesian axes according to:

$$\vec{\omega} = \tilde{U}^{-1} \cdot \vec{\tilde{\omega}}.$$

Self-Learning Algorithms

In practice in some circumstances it is only possible for there to be incorrect orientations of one of the three acceleration sensors and one of the three rotational speed sensors. Two of the three sensors respectively are normally housed on a board. Two sensors can even be embodied as a dual axis sensor. The third of the three sensors respectively may be incorporated on a second printed circuit board, which is turned through an angle of 90°+ϵ in relation to the first.

Incorrect orientations and offsets can be determined during operation of the vehicle with the aid of self-learning algorithms. This is to be illustrated for the specific instance mentioned above of two boards not exactly at right angles to each other.

If the entire sensor cluster is tilted about the longitudinal or transverse axis of the vehicle, long-term mean values of the difference between values measured by the longitudinal and transverse acceleration sensors and the actual accelerations determined from the wheel speeds and steering angle are used first to determine the tilt angles $\phi$ and $\theta$ of the entire cluster and to correct the value of the vertical acceleration sensor by this overall incorrect orientation. Then while the vehicle is stationary the measured values of the effective longitudinal and transverse acceleration sensors can be used to determine the vehicle inclination and to determine the angle ϵ by means of a comparison with the output of the vertical acceleration sensor. The signal of the vertical acceleration sensor and the signals of all three rotational speed sensors are then corrected by the incorrect orientation angles $\phi$, $\theta$ and ϵ.

Determination of the Position of the Sensor Cluster

To determine the position of the sensor cluster in the longitudinal direction, the following equation can be used:

$$\int_0^T a_x(t)dt = v_x(T) - v_x(0) + l_R \int_0^T \omega_z^2(t)dt$$

Here $v_x$ is the longitudinal velocity of the vehicle and $l_R$ is the distance between the sensor cluster and the rear axle. The following kinematic relationship is used here:

$$a_x = \dot{v}_x + v_y \omega_z$$

Here $v_y$ is the transverse velocity of the vehicle. If the rear axle rolls, then $$v_y = l_R \omega_z.$$

Insertion and integration give the said equation.

Use is made here of the fact that the longitudinal acceleration does not average out to zero, if it is not measured on the unsteered rear axle.

The temporal mean values occurring in this equation may only be executed over those time intervals, in which oblique running angles of the rear wheels are negligible. The sensor value for the longitudinal acceleration must be corrected by the relevant pitch angle. Corrections can be incorporated into the above equation, which take into account the final oblique running angles of the rear wheels and therefore extend the range of validity of this equation to higher velocities. The corrections consist of $v_y$ being specified by means of a side slip angle determination beyond the term $l_R\omega_z$. The side slip angle $\beta$ is $\arctan(v_y/v_x)$.

What is claimed is:

1. A method for determining incorrect orientations of sensors of a sensor cluster in a vehicle, wherein the sensor cluster has either three linear acceleration sensors and/or three rotational speed sensors;
the method comprising:
installing the sensor cluster in a vehicle;
determining the position of a sensor cluster with respect to the longitudinal direction of a vehicle;
wherein the distance between the sensor cluster and a rear axle of the vehicle is determined by averaging the longitudinal acceleration of the vehicle, which is not measured on the rear axle;
predetermining desired installation directions of the sensors in relation to coordinate axes of a fixed vehicle Cartesian coordinate system;
determining actual installation directions of the sensors, which can deviate from the desired installation directions due to incorrect orientations, by comparing values measured by the sensors in different conditions with values known for these different conditions in the fixed vehicle Cartesian coordinate system, wherein
at least values determined by other sensors arranged in the vehicle are selected as known values in the fixed vehicle Cartesian coordinate system.

2. The method according to claim 1, wherein
any offset is determined during measurements by the sensors by means of a suitable plurality of measurements by the sensors in different conditions, which result in known values in the fixed vehicle Cartesian coordinate system.

3. The method according to claim 1, wherein
mean values during a vehicle trip are selected as known values in the fixed vehicle Cartesian coordinate system.

4. The method according to claim 1, wherein the other sensors arranged in the vehicle are selected from the group consisting of wheel speed sensor and steering angle sensor.

5. A method for correcting measurement values of sensors of a sensor cluster in a vehicle, comprising:
installing the sensor cluster in a vehicle;
determining the position of a sensor cluster with respect to the longitudinal direction of a vehicle;
wherein the distance between the sensor cluster and a rear axle of the vehicle is determined by averaging the longitudinal acceleration of the vehicle, which is not measured on the rear axle;
determining incorrect orientations of the sensors by predetermining desired installation directions of the sensors in relation to coordinate axes of a fixed vehicle Cartesian coordinate system and determining actual installation directions of the sensors by comparing values measured by the sensors in different conditions with values known for these different conditions in the fixed vehicle Cartesian coordinate system, wherein
at least values determined by other sensors arranged in the vehicle are selected as known values in the fixed vehicle Cartesian coordinate system; and
wherein with the aid of incorrect orientations determined from values measured by the sensors actual values of the vehicle in relation to a fixed vehicle Cartesian coordinate system are predicted.

6. The method according to claim 5, wherein
any offset is determined during measurements by the sensors by means of a suitable plurality of measurements by the sensors in different conditions, which result in known values in the fixed vehicle Cartesian coordinate system.

7. The method according to claim 5, wherein
mean values during a vehicle trip are selected as known values in the fixed vehicle Cartesian coordinate system.

8. The method according to claim 5, wherein
values determined by other sensors are selected as known values in the fixed vehicle Cartesian coordinate system.

9. The method according to claim 5, wherein the other sensors arranged in the vehicle are selected from the group consisting of wheel speed sensor and steering angle sensor.

10. A method for determining the position of an inertial sensor cluster in a vehicle, the method comprising the steps of:
installing the inertial sensor cluster in a vehicle;
receiving sensor data from the inertial sensor cluster during movement of the vehicle and determining the position of the inertial sensor cluster from the received sensor data with respect to the longitudinal direction of the vehicle,
wherein for determining the position of the inertial sensor cluster, the distance between the inertial sensor cluster and a rear axle of the vehicle is determined by averaging the longitudinal acceleration of the vehicle, which is not measured on the rear axle.

11. A non-transitory computer readable medium storing a computer program, which when executed on a computation unit, a microcontroller, DSP, FPGA or computer or on a plurality of these in a network, performs the steps of:
determining the position of an inertial sensor cluster with respect to the longitudinal direction of a vehicle;
wherein the distance between the inertial sensor cluster and a rear axle of the vehicle is determined by averaging the longitudinal acceleration of the vehicle, which is not measured on the rear axle;
predetermining desired installation directions of sensors of the sensor cluster within a vehicle in relation to coordinate axes of a fixed vehicle Cartesian coordinate system;
determining actual installation directions of the sensors within the vehicle by comparing values measured by the sensors in different conditions with values known for these different conditions in the fixed vehicle Cartesian coordinate system, wherein
values determined by other sensors arranged in the vehicle are selected as known values in the fixed vehicle Cartesian coordinate system.

12. The non-transitory computer readable medium according to claim 11, wherein
any offset is determined during measurements by the sensors by means of a suitable plurality of measurements by the sensors in different conditions, which result in known values in the fixed vehicle Cartesian coordinate system.

13. The non-transitory computer readable medium according to claim 11, wherein mean values during a vehicle trip are selected as known values in the fixed vehicle Cartesian coordinate system.

14. A method for determining incorrect orientations of sensors of a sensor cluster in a vehicle, wherein the sensor cluster has either three linear acceleration sensors and/or three rotational speed sensors;

the method comprising the steps of:

installing the sensor cluster in a vehicle remote from an unsteered axle;

determining the position of the sensor cluster with respect to the longitudinal direction of the vehicle, wherein the distance between the sensor cluster and a rear axle of the vehicle is determined by averaging the longitudinal acceleration of the vehicle, which is not measured on the rear axle;

predetermining desired installation directions of the sensors in relation to coordinate axes of a fixed vehicle Cartesian coordinate system;

determining actual installation directions of the sensors within the vehicle, which can deviate from the desired installation directions due to incorrect orientations, by comparing values measured by the sensors in different conditions with values known for these different conditions in the fixed vehicle Cartesian coordinate system, wherein mean values accumulated during a vehicle trip are selected as known values in the fixed vehicle Cartesian coordinate system, and wherein values determined by other sensors arranged in the vehicle are selected as known values in the fixed vehicle Cartesian coordinate system.

15. The method according to claim 14, wherein the vehicle trip includes starts and ends with a stationary state.

* * * * *